(12) United States Patent
Okamura et al.

(10) Patent No.: US 10,732,591 B2
(45) Date of Patent: *Aug. 4, 2020

(54) APPARATUS AND METHOD FOR ESTABLISHING COMMUNICATION BETWEEN AN OPERATION TERMINAL AND A CONTROLLER WHEN ONLY ONE CONTROLLER IS CONNECTED

(71) Applicant: OMRON CORPORATION, Kyoto (JP)

(72) Inventors: Kotaro Okamura, Siga (JP); Yuta Nagata, Siga (JP)

(73) Assignee: OMRON CORPORATION, Kyoto (JP)

( * ) Notice: Subject to any disclaimer, the term of this patent is extended or adjusted under 35 U.S.C. 154(b) by 78 days.

This patent is subject to a terminal disclaimer.

(21) Appl. No.: 16/035,947

(22) Filed: Jul. 16, 2018

(65) Prior Publication Data
US 2018/0321647 A1 Nov. 8, 2018

Related U.S. Application Data

(63) Continuation of application No. 14/003,338, filed as application No. PCT/JP2011/073813 on Oct. 17, 2011, now Pat. No. 10,048,659.

(30) Foreign Application Priority Data

Mar. 15, 2011 (JP) ................................ 2011-056377

(51) Int. Cl.
*G05B 15/02* (2006.01)
*G05B 19/042* (2006.01)
(Continued)

(52) U.S. Cl.
CPC ............... *G05B 15/02* (2013.01); *G05B 6/02* (2013.01); *G05B 19/042* (2013.01);
(Continued)

(58) Field of Classification Search
CPC ..................................................... G05B 15/02
(Continued)

(56) References Cited

U.S. PATENT DOCUMENTS 7,587,495 B2 * 9/2009 Albouze ........... H04L 29/12009
709/220
7,801,078 B2 * 9/2010 Kim ..................... H04L 12/2854
370/255

(Continued)

FOREIGN PATENT DOCUMENTS

| JP | 2007-243825 | 9/2007 |
|---|---|---|
| JP | 2009-267720 | 11/2009 |
| JP | 2011-10151 | 1/2011 |

OTHER PUBLICATIONS

International Search Report for PCT/JP2011/073813, along with English language translation, dated Dec. 13, 2011.

(Continued)

*Primary Examiner* — Suresh Suryawanshi
(74) *Attorney, Agent, or Firm* — Greenblum & Bernstein, P.L.C.

(57) ABSTRACT

A control system includes a computer and at least one programmable logic controller connected to the computer. When the number of programmable logic controllers connected to the computer is one, the computer communicates with the connected programmable logic controller.

15 Claims, 13 Drawing Sheets

(51) Int. Cl.
*H04L 29/12* (2006.01)
*G05B 6/02* (2006.01)

(52) U.S. Cl.
CPC ...... *H04L 61/2015* (2013.01); *H04L 61/1511* (2013.01); *H04L 61/2038* (2013.01); *H04L 61/2092* (2013.01); *H04L 61/6004* (2013.01); *H04L 61/6022* (2013.01)

(58) Field of Classification Search
USPC .......................................................... 700/9
See application file for complete search history.

(56) References Cited

U.S. PATENT DOCUMENTS

| | | |
|---|---|---|
| 2005/0018697 A1 | 1/2005 | Enns et al. |
| 2007/0142940 A1 | 6/2007 | Ferguson et al. |
| 2008/0024819 A1* | 1/2008 | Tanji ................. H04L 29/12216 358/1.15 |
| 2008/0059616 A1* | 3/2008 | Shizuno ............ H04L 29/12301 709/222 |
| 2008/0137658 A1* | 6/2008 | Wang ................. H04L 12/4625 370/392 |
| 2008/0257955 A1 | 10/2008 | Adachi |
| 2008/0282182 A1 | 11/2008 | Oosaka |
| 2012/0252439 A1* | 10/2012 | Peterson ............... H04W 24/08 455/423 |

OTHER PUBLICATIONS

International Preliminary Report on Patentability for PCT/JP2011/073813, along with English language translation, dated Nov. 8, 2012.

* cited by examiner

Fig. 3

| | 141 |
|---|---|
| Link local address | 169.254.30.1 |
| IP Address | 192.168.250.1 |
| MAC Address | 00-0B-97-12-5A-20 |
| Name | First controller |
| Type | CJ2H-CPU67 |
| Unit version | 1.0 |

Fig. 4

|  | First controller | Second controller | Third controller | Fourth controller |
|---|---|---|---|---|
| Link local address | 169.254.30.1 | 169.254.78.35 | 169.254.60.57 | 169.254.78.12 |
| IP Address | 192.168.250.1 | 0.0.0.0 | 192.168.70.2 | 192.168.250.1 |
| MAC Address | 00-0B-97-12-5A-20 | 00-0C-12-5A-20-11 | 14-32-0B-97-12-5A | 55-0B-97-12-5A-20 |
| Name | First controller | Second controller | Third controller | Fourth controller |
| Type | CJ2H-CPU67 | CJ2H-CPU77 | CJ2H-CPU52 | CJ2H-CPU67 |
| Unit version | 1.0 | 1.0 | 1.2 | 1.1 |

| Name | Type | IP Address | MAC Address | Unit version |
|---|---|---|---|---|
| First controller | CJ2H-CPU67 | 192.168.250.1 | 00-0B-97-12-5A-20 | 1.0 |
| Second controller | CJ2H-CPU77 | 0.0.0.0 | 00-0C-12-5A-20-11 | 1.0 |
| Third controller | CJ2H-CPU52 | 192.168.70.2 | 14-32-0B-97-12-5A | 1.2 |
| Fourth controller | CJ2H-CPU67 | 192.168.250.1 | 55-0B-97-12-5A-20 | 1.1 | ered herein by reference in its
APPARATUS AND METHOD FOR ESTABLISHING COMMUNICATION BETWEEN AN OPERATION TERMINAL AND A CONTROLLER WHEN ONLY ONE CONTROLLER IS CONNECTED

CROSS-REFERENCE TO RELATED APPLICATION

The present application is a continuation of U.S. patent application Ser. No. 14/003,338, filed Nov. 19, 2013, which is a national stage entry of International Pat. Appl. No. PCT/JP2011/073813, filed Oct. 17, 2011, which claims the benefit of Japanese Pat. Appl. No. 2011-056377, filed on Mar. 15, 2011. The entire disclosure of each of the above-identified applications, including the specification, drawings, and claims, is incorporated herein by reference in its entirety.

TECHNICAL FIELD

The present invention relates to a control system, an operation terminal and a program. In particular, the present invention relates to a technique of establishing communication between an operation terminal and a control device.

BACKGROUND ART

There has been known a programmable logic controller (PLC) used as a control device for a manufacturing machine in an automated factory and the like. For example, the programmable logic controller is administered using a computer (e.g., a commercially available personal computer) having installed therein software called a tool, or a display unit used for setting the programmable logic controller.

Some networks for connecting the programmable logic controller, the computer and the display unit utilize the Ethernet (registered trademark). When one programmable logic controller and one computer are connected to each other on such a network, communication can be established between the programmable logic controller and the computer even if the respective IP addresses are unknown, as disclosed in the third paragraph of Japanese Unexamined Patent Publication No. 2009-267720 (Patent Document 1).

On the other hand, in a case where a different programmable logic controller is erroneously connected to a network where one programmable logic controller and one computer are connected to each other, the erroneous transmission of packets can be prevented by storing the identification information of the originally connected programmable logic controller, as disclosed in Japanese Unexamined Patent Publication No. 2009-267720.

PRIOR ART DOCUMENT

Patent Document

Patent Document 1: Japanese Unexamined Patent Publication No. 2009-267720

SUMMARY OF THE INVENTION

Problems to be Solved by the Invention

In Japanese Unexamined Patent Publication No. 2009-267720, however, no consideration is given to a case where a user erroneously connects a computer to a network where two or more programmable logic controllers are connected in actual fact while misunderstanding that the number of programmable logic controllers on the network is one.

It is an object of the present invention to prevent unusual communication due to the misunderstanding of a user.

Means for Solving the Problems

A control system includes an operation terminal and at least one control device connected to the operation terminal. The operation terminal includes a determination part for determining whether the number of control devices connected to the operation terminal is one, and a communication part for communicating with the connected control device when the number of control devices connected to the operation terminal is one.

An operation terminal includes a determination part for determining whether the number of control devices connected to the operation terminal is one, and a communication part for communicating with the connected control device when the number of control devices connected to the operation terminal is one.

A program allows an operation terminal to execute a step of determining whether the number of control devices connected to the operation terminal is one, and a step of communicating with the connected control device when the number of control devices connected to the operation terminal is one.

Effect of the Invention

According to the present invention, when the number of control devices connected to the operation terminal is one, communication is established between the operation terminal and the control device. Accordingly, no communication is established even when a user erroneously connects an operation terminal to a network where two or more control devices are connected in actual fact while misunderstanding that the number of control devices on the network is one. As the result, it is possible to prevent unusual communication due to the misunderstanding of the user.

BRIEF DESCRIPTION OF THE DRAWINGS

FIG. 3 is a diagram illustrating information of the programmable logic controller.

FIG. 4 is a diagram illustrating network configuration information in a case where two or more programmable logic controllers are connected to a network.

FIG. 14 is a diagram illustrating node list information.

MODES FOR CARRYING OUT THE INVENTION

Figure 1:
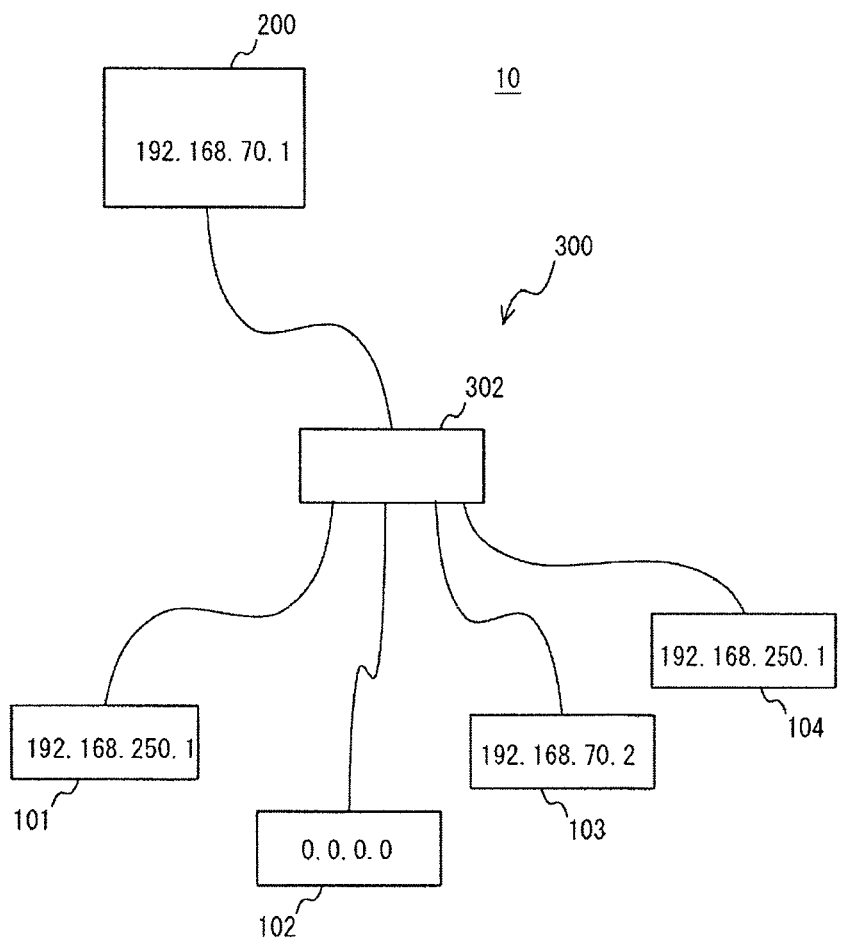
FIG. 1 is a schematic diagram illustrating a general control system.

With reference to FIG. 1, description will be given of a control system 10 according to one embodiment of the present invention. The control system 10 includes a first programmable logic controller (hereinafter, simply described as "first controller") 101, a second programmable logic controller (hereinafter, simply described as "second controller") 102, a third programmable logic controller (hereinafter, simply described as "third controller") 103, a fourth programmable logic controller (hereinafter, simply described as "first controller") 104, and a computer 200. The number of programmable logic controllers is not limited to four as long as it is one or more.

Each of the first controller 101, the second controller 102, the third controller 103 and the fourth controller 104 is used as a control device. The computer 200 is used as an operation terminal operated by a user.

The first controller 101, the second controller 102, the third controller 103, the fourth controller 104 and the computer 200 are electrically connected to one another via a network 300.

Each of the first controller 101, the second controller 102, the third controller 103, the fourth controller 104 and the computer 200 is connected to a hub 302 on the network 300 through a communication cable. The first controller 101, the second controller 102, the third controller 103, the fourth controller 104 and the computer 200 may be connected to one another in a radio manner.

The network 300 utilizes the Ethernet (registered trademark) to establish mutual connections among the first controller 101, the second controller 102, the third controller 103, the fourth controller 104 and the computer 200. Herein, well-known techniques may be used as the connecting method utilizing the Ethernet (registered trademark). Therefore, the detailed description of the connecting method will not be given repeatedly in this embodiment. Communication standards other than the Ethernet (registered trademark) may be utilized.

Different working machines are connected to the first controller 101, the second controller 102, the third controller 103 and the fourth controller 104, respectively. The first controller 101, the second controller 102, the third controller 103 and the fourth controller 104 function as control devices for these working machines.

The computer 200 is, for example, a commercially available personal computer. The computer 200 used herein may be any types of computers such as a notebook computer, a desktop computer and a mobile information terminal (PDA: Personal Digital Assistant).

The computer 200 has installed therein an engineering tool which is a program allowing the computer 200 to execute desired functions. The user operates the computer 200, thereby changing settings for the first controller 101, the second controller 102 and the third controller 103.

In place of or in addition to the computer 200, a dedicated control device called a programmable display unit may be connected to the network 300. That is, such a programmable display unit may be used as the operation terminal. The programmable display unit displays the operating statuses, the details of settings, and the like with regard to the first controller 101, the second controller 102, the third controller 103 and the fourth controller 103. The programmable display unit has, for example, a touch panel. The user operates the touch panel, thereby changing the settings for the first controller 101, the second controller 102, the third controller 103 and the fourth controller 104.

In place of or in addition to the programmable controller, the programmable display unit may be connected to the network 300 and may be used as the control device.

Each of the first controller 101, the second controller 102, the third controller 103, the fourth controller 104 and the computer 200 has allocated thereto an IP address. The allocated IP addresses are registered (stored) in the first controller 101, the second controller 102, the third controller 103, the fourth controller 104 and the computer 200, respectively, by means of a dedicated tool or the like.

For example, the first controller 101 has allocated thereto an IP address "192.168.250.1". An IP address is allocated to the second controller 102 by means of a DHCP (Dynamic Host Configuration Protocol). However, since a DHCP server is not provided in the example illustrated in FIG. 1, the IP address cannot be allocated to the second controller 102. Therefore, the second controller 102 has allocated thereto an IP address "0.0.0.0".

The third controller 103 has allocated thereto an IP address "192.168.70.2". The fourth controller 104 has allocated thereto an IP address "192.168.250.1". Herein, this IP address is erroneously set, and should be set at, for example, "192.168.250.2" in a normal situation.

The computer 200 has allocated thereto an IP address "192.168.70.1". In this embodiment, the IP address to be allocated to each of the first controller 101, the third controller 103, the fourth controller 104 and the computer 200 is a unique IP address selected by a user who designs or administers a manufacturing line and the like. These IP addresses are merely one example, and IP addresses to be allocated herein are not limited thereto.

Each of the first controller 101, the second controller 102, the third controller 103, the fourth controller 104 and the computer 200 automatically sets a link local address which is different from the IP address. The link local address may be used as an alias. A function of allocating a plurality of addresses as described above is called an IP alias. The function of this IP alias is known as one of techniques utilizing the Ethernet (registered trademark).

For example, the first controller 101 sets the link local address thereof at "169.254.30.1". The second controller 102 sets the link local address thereof at "169.254.78.35". The third controller 103 sets the link local address thereof at "169.254.60.57". The fourth controller 104 sets the link local address thereof at "169.254.78.12". The computer 200 sets the link local address thereof at "169.254.30.3". These link local addresses are merely one example, and link local addresses to be set herein are not limited thereto.

Each of the first controller 101, the second controller 102, the third controller 103, the fourth controller 104 and the computer 200 sets a link local address which is different from a link local address set by the different device. In other words, the link local addresses set by the first controller 101, the second controller 102, the third controller 103, the fourth controller 104 and the computer 200 are different from one another.

Figure 2:
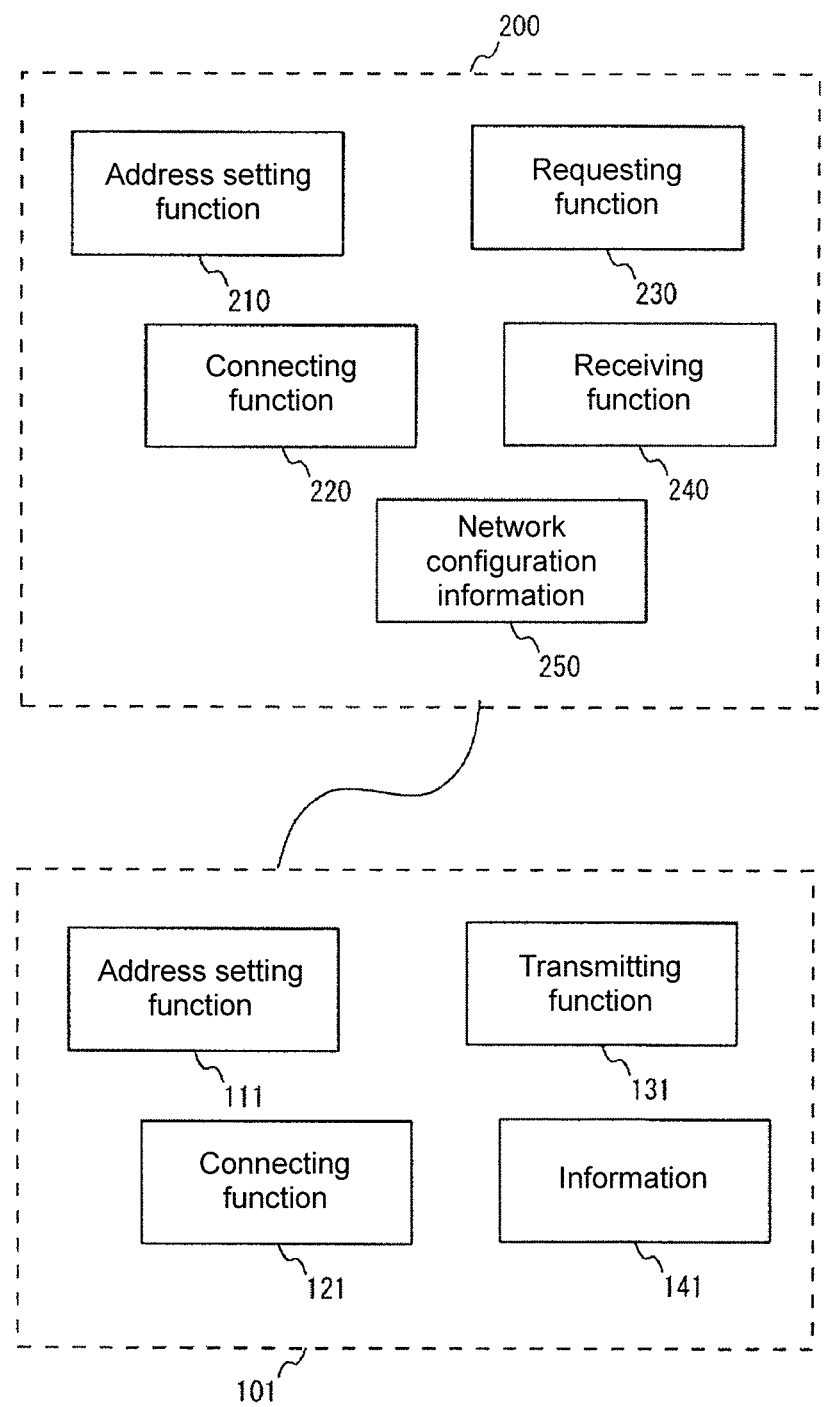
FIG. 2 is a functional block diagram illustrating functions of a programmable logic controller and functions of a computer.

With reference to FIG. 2, description will be given of the functions of each of the first controller 101, the second controller 102, the third controller 103, the fourth controller 104 and the computer 200. FIG. 2 illustrates only the first controller 101 among the first controller 101, the second controller 102, the third controller 103 and the fourth controller 104. The functions of each of the second controller 102, the third controller 103 and the fourth controller 104 are equal to or substantially equal to those of the first controller 101; therefore, the detailed description thereof will not be given repeatedly in this embodiment.

The first controller 101 (the second controller 102, the third controller 103, the fourth controller 104) has an address setting function 111, a connecting function 121 and a transmitting function 131. The address setting function 111 sets the link local address described above. The connecting function 121 connects to (communicates with) the network 300.

The transmitting function 131 transmits information 141 of the first controller 101 via the network 300. These functions are realized in such a manner that a CPU (Central Processing Unit) executes a program installed in the first controller 101, for example.

FIG. 3 illustrates one example of the information 141 of the first controller 101. The information 141 of the first controller 101 contains the link local address, the IP address, a MAC (Media Access Control) address, additional information such as a name, a type, a unit version, and the like. These kinds of information are merely one example, and the information 141 of the first controller 101 is not limited thereto.

Referring to FIG. 2 again, the computer 200 has an address setting function 210, a connecting function 220, a requesting function 230 and a receiving function 240. The address setting function 210 sets the link local address described above. The connecting function 220 connects to (communicates with) the network 300.

The requesting function 230 issues, to each of the first controller 101, the second controller 102, the third controller 103 and the fourth controller 104, a request to transmit information containing the IP address of each controller to the link local address of the computer 200. The request regarding the information containing the IP address is broadcast to the first controller 101, the second controller 102, the third controller 103 and the fourth controller 104. Upon reception of the request, each of the first controller 101, the second controller 102, the third controller 103 and the fourth controller 104 transmits the information thereof to the link local address of the computer 200.

The receiving function 240 receives the information from each of the first controller 101, the second controller 102, the third controller 103 and the fourth controller 104. These functions are realized in such a manner that a CPU executes an engineering tool which is a program installed in the computer 200, for example.

The first controller 101, the second controller 102, the third controller 103 or the fourth controller 104 may be configured to have the requesting function 230 and the receiving function 240 of the computer 200.

The computer 200 generates network configuration information 250 on the basis of the information received from each programmable logic controller. FIG. 4 illustrates one example of the network configuration information 250. The network configuration information 250 is generated by integrating the pieces of information received from the respective programmable logic controllers.

Figure 5:
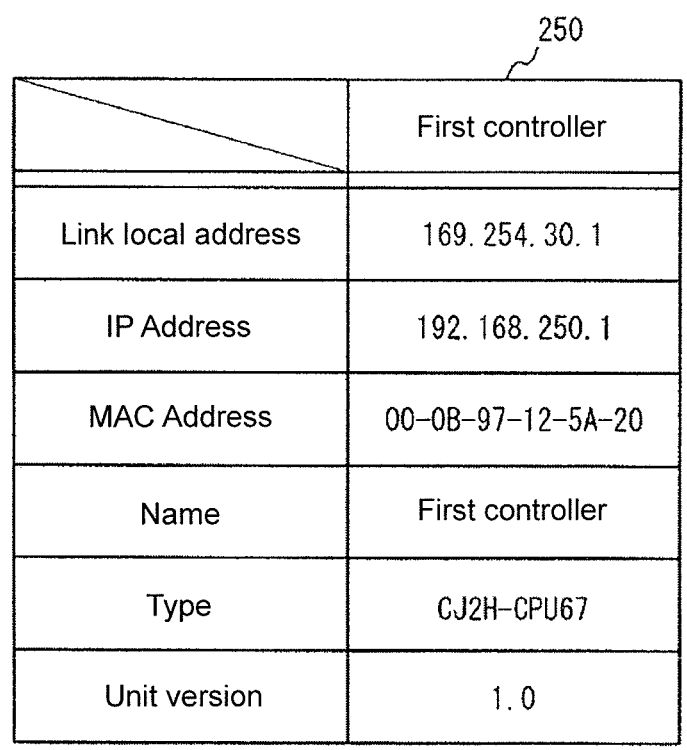
FIG. 5 is a diagram illustrating network configuration information in a case where one programmable logic controller is connected to the network.

In a case where a programmable logic controller connected to the network 300 is only the first controller 101, the network configuration information 250 contains only the information of the first controller 101 as illustrated in FIG. 5. Accordingly, it can be determined that the number of programmable logic controllers connected to the computer 200 is one when the information is received from only one programmable logic controller. Herein, the network configuration information 250 may contain the information (e.g., the IP address, the link local address) of the computer 200.

Figure 6:
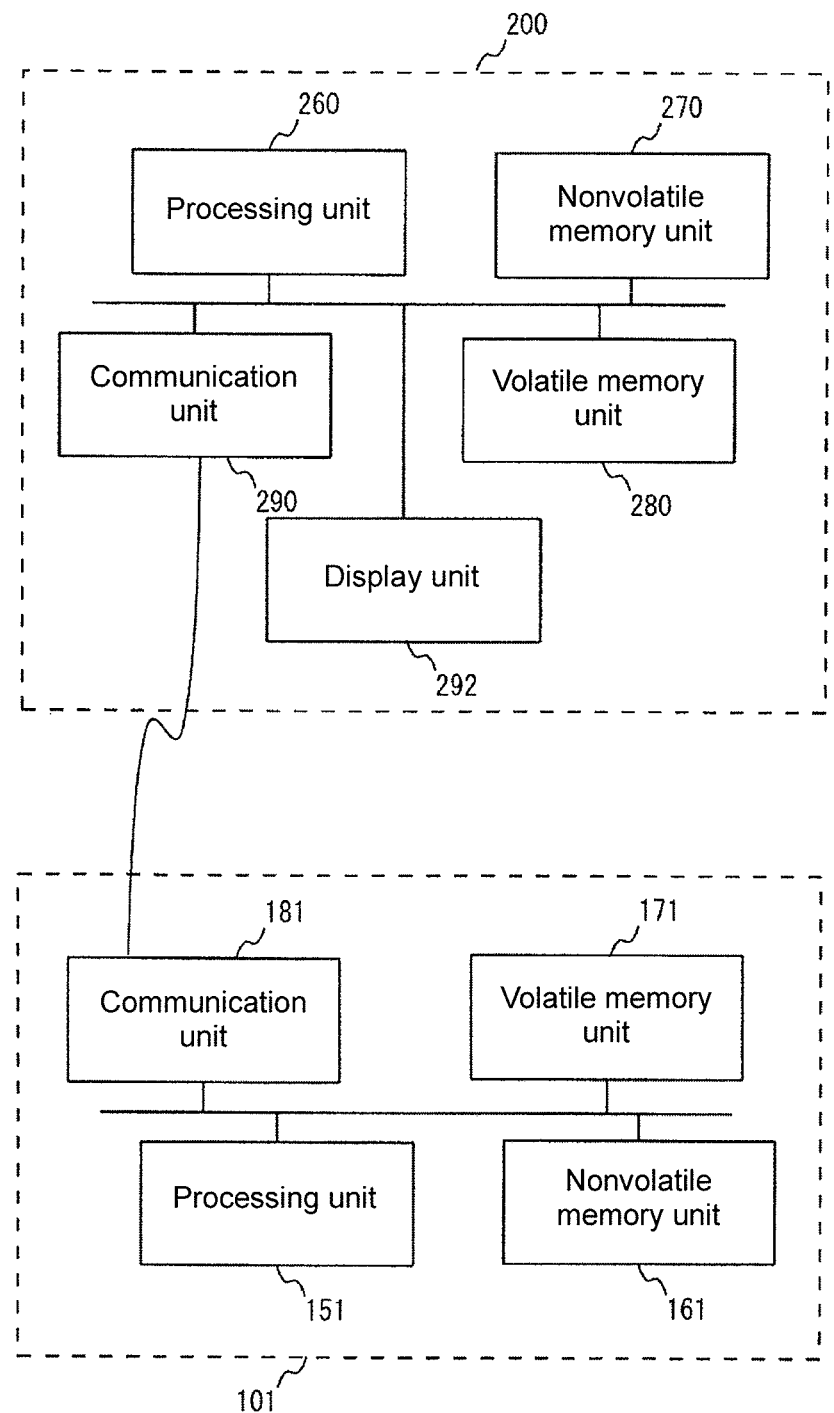
FIG. 6 is a block diagram illustrating a hardware configuration of the programmable logic controller and a hardware configuration of the computer.

With reference to FIG. 6, description will be given of hardware configurations of the first controller 101, second controller 102, third controller 103, fourth controller 104 and computer 200.

FIG. 6 illustrates only the first controller 101 among the first controller 101, the second controller 102, the third controller 103 and the fourth controller 104. The hardware configurations of the second controller 102, third controller 103 and fourth controller 104 are equal to or substantially equal to that of the first controller 101; therefore, the detailed description thereof will not be given repeatedly in this embodiment.

The first controller 101 (the second controller 102, the third controller 103, the fourth controller 104) includes a processing unit 151, a nonvolatile memory unit 161, a volatile memory unit 171 and a communication unit 181.

The processing unit 151 is, for example, a CPU. The processing unit 151 executes various kinds of software (programs) including an operating system (OS). The nonvolatile memory unit 161 is, for example, a ROM (Read Only Memory) or an HDD (Hard Disk Drive). The nonvolatile memory unit 161 stores therein an execution module for software executed by the processing unit 151.

The volatile memory unit 171 is, for example, a RAM (Random Access Memory). The volatile memory unit 171 is used for holding work regions to be required by the respective kinds of software.

The communication unit 181 is used for controlling communication established via the network 300. The communication unit 181 may be an external device of the first controller 101.

The computer 200 includes a processing unit 260, a nonvolatile memory unit 270, a volatile memory unit 280, a communication unit 290 and a display unit 292. The processing unit 260, the nonvolatile memory unit 270, the volatile memory unit 280 and the communication unit 290 are equal to or substantially equal to the processing unit 151, the nonvolatile memory unit 161, the volatile memory unit 171 and the communication unit 181, respectively. Accordingly, the detailed description thereof will not be given repeatedly in this embodiment.

The display unit 292 displays various kinds of information such as the network configuration information 250 described above. The display unit 292 used herein is a typical monitor or the like.

Figure 7:
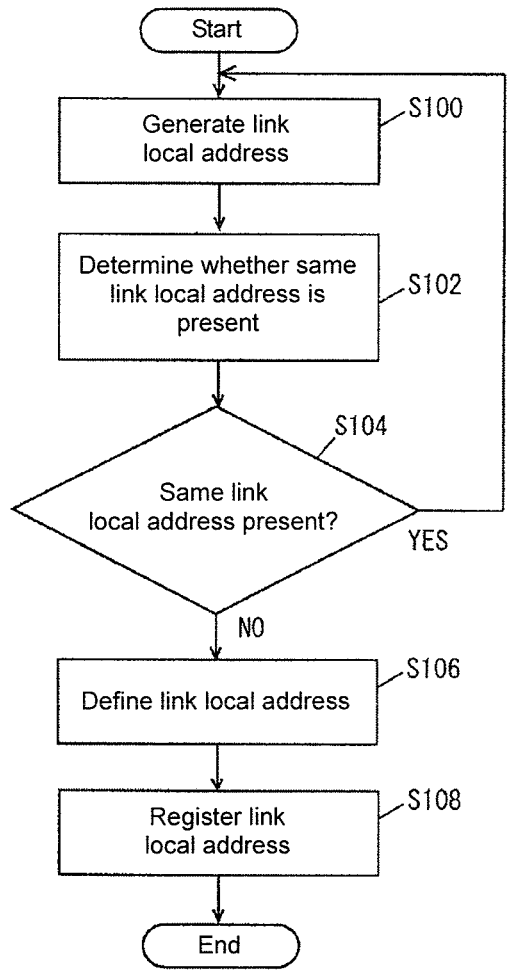
FIG. 7 is a flowchart illustrating a control structure of a program to be executed for setting a link local address.

With reference to FIG. 7, description will be given of a control structure of the program to be executed by each of the first controller 101, the second controller 102, the third controller 103, the fourth controller 104 and the computer 200 in order to set the link local address. The following program is executed by each of the first controller 101, the second controller 102, the third controller 103, the fourth controller 104 and the computer 200. This program is executed when a communication cable such as a LAN (Local Area Network) cable is inserted into a port of the first controller 101, the second controller 102, the third controller 103, the fourth controller 104 or the computer 200.

In step (hereinafter, abbreviated as "S") 100, the link local address is generated on the basis of the MAC address. As is well known, the MAC address is a unique ID number to an Ethernet card attached to each device. The MAC address is represented by a combination of a unique number defined for each manufacturer with an optional number which can be allocated by the manufacturer uniquely. As one example, accordingly, the link local address is generated as a combination of the unique number to the manufacturer in the MAC address with an optional number to be defined randomly within a range which does not overlap the MAC address. The method of generating the link local address is not limited thereto.

After the generation of the link local address, in S102, an address resolution protocol (ARP) request is broadcast to the generated link local address in order to determine whether the same link local address as the generated link local address is present on the network 300.

When there is a response to the ARP request, i.e., when the device having the same link local address as the generated link local address is present on the network 300 (YES in S104), a link local address is generated again (S100).

When there is no response to the ARP request, i.e., when the device having the same link local address as the generated link local address is not present on the network 300 (NO in S104), the generated link local address is defined as the link local address of the device (S106). In S108, next, the defined link local address is registered as an alias.

Figure 8:
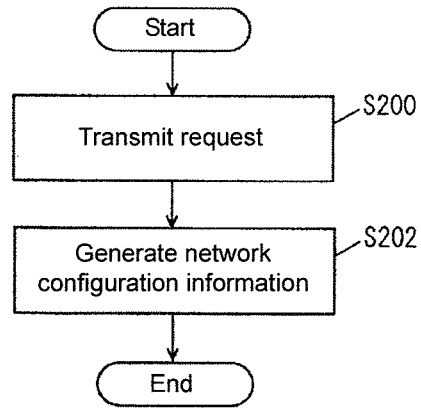
FIG. 8 is a flowchart illustrating a control structure of a program to be executed for generating network configuration information.

With reference to FIG. 8, description will be given of a control structure of the program to be executed by the computer 200 in order to generate the network configuration information 250 illustrated in FIG. 4 or FIG. 5. In this embodiment, the following program is executed by the computer 200.

In S200, the computer 200 broadcasts the request regarding the information containing the IP address to each of the first controller 101, the second controller 102, the third controller 103 and the fourth controller 104.

In S202, next, the computer 200 receives the information from each programmable logic controller, and generates the network configuration information 250 on the basis of the received information.

Figure 9:
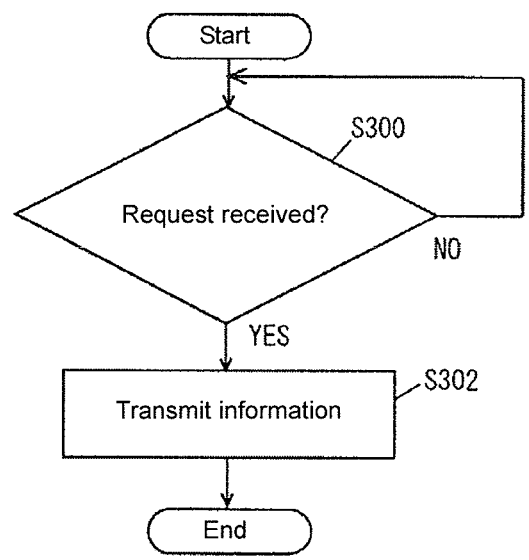
FIG. 9 is a flowchart illustrating a control structure of a program to be executed for transmitting information of the programmable logic controller.

With reference to FIG. 9, description will be given of a control structure of the program to be executed by each of the first controller 101, the second controller 102, the third controller 103 or the fourth controller 104 in order to transmit the information.

In S300, the programmable logic controller determines whether the request regarding the information containing the IP address is received. Upon reception of the request (YES in S300), in S302, the programmable logic controller transmits the information to the link local address of the computer 200.

Figure 10:
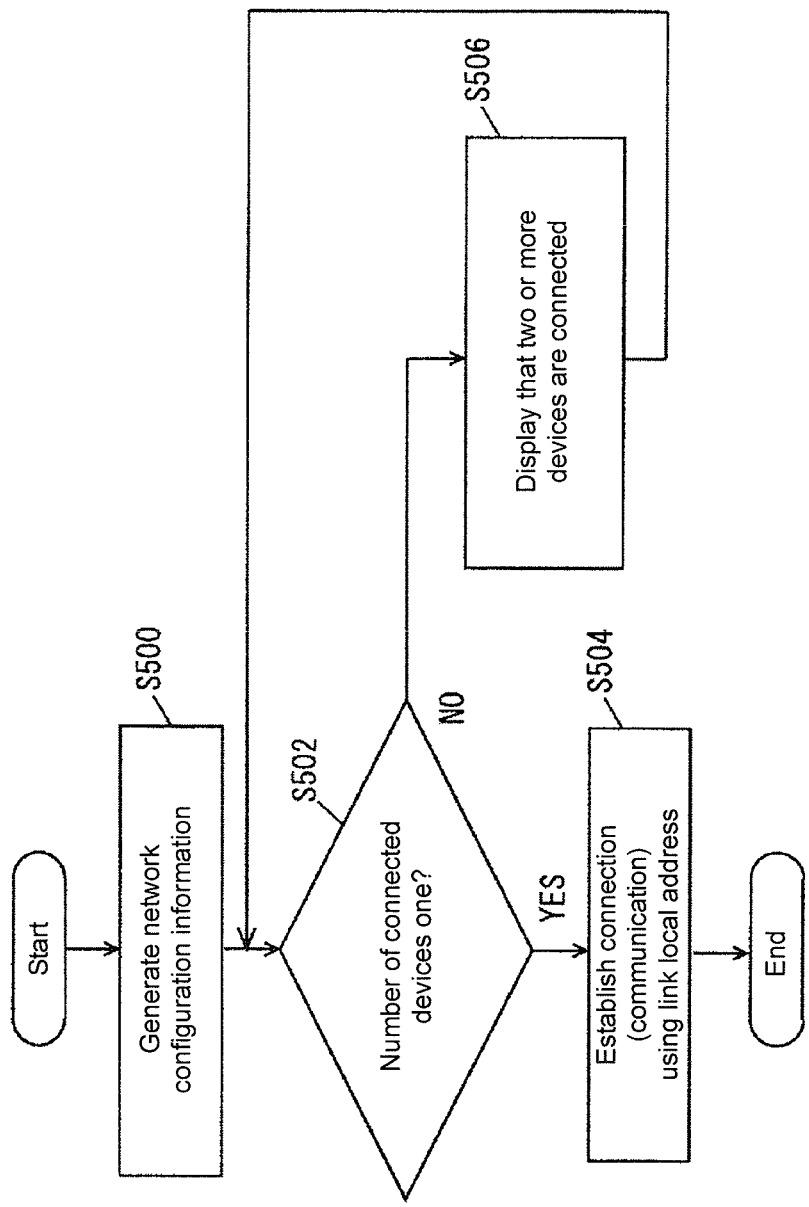
FIG. 10 is a flowchart illustrating a control structure of a program to be executed by the computer in order to communicate with one programmable logic controller.

With reference to FIG. 10, description will be given of a control structure of the program to be executed by the computer 200 in order to communicate with the programmable logic controller.

In S500, the computer 200 generates the network configuration information 250. In S502, the computer 200 determines whether the number of devices connected to the computer 200 by means of the Ethernet (registered trademark) is one, on the basis of the network configuration information 250. For example, upon reception of the information containing the IP address from only one device (the programmable logic controller), the computer 200 determines that the number of devices connected to the computer 200 is one.

When the number of devices connected to the computer 200 by means of the Ethernet (registered trademark) is one (YES in S502), in S504, the computer 200 establishes communication using the link local address of the programmable logic controller 105 connected to the computer 200.

On the other hand, when the number of devices connected to the computer 200 by means of the Ethernet (registered trademark) is two or more (NO in S502), in S506, the display unit 292 of the computer 200 displays that the two or more devices are connected to the computer 200.

Figure 11:
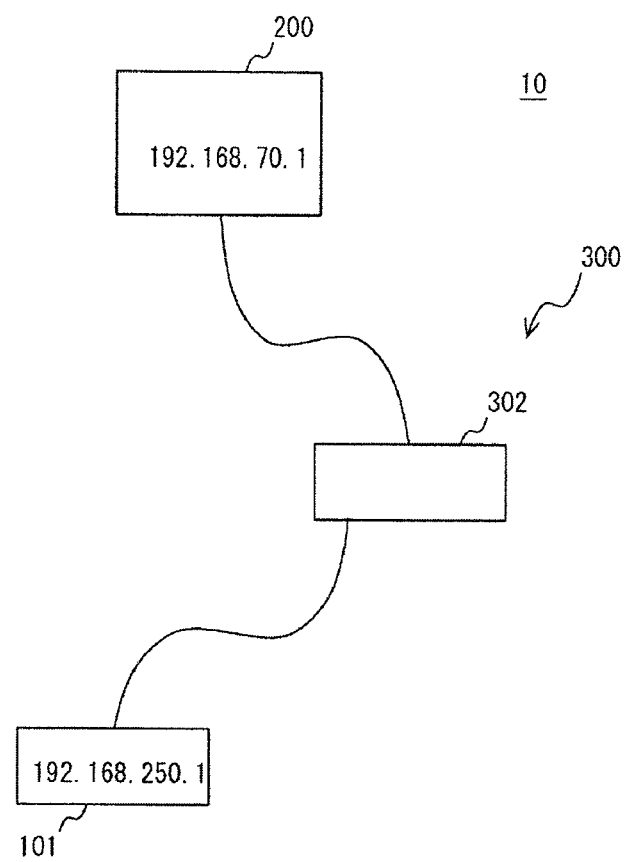
FIG. 11 is a diagram illustrating a state that one computer is connected to one programmable logic controller via a hub.
Figure 12:
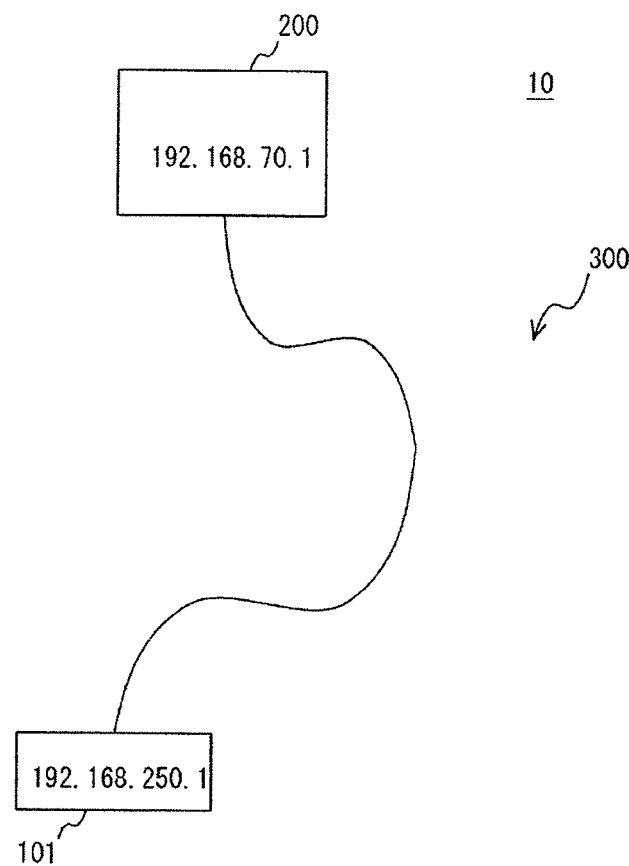
FIG. 12 is a diagram illustrating a state that one computer is connected to one programmable logic controller without the hub.

Accordingly, in a case where one computer 200 is connected to one programmable logic controller (e.g., the first controller 101) via the hub 302 as illustrated in FIG. 11 or in a case where one computer 200 is directly connected to one programmable logic controller without the hub 302 as illustrated in FIG. 12, the computer 200 communicates with the programmable logic controller. Even in a case where the computer 200 is connected to one programmable display unit rather than one programmable logic controller, similarly, the computer 200 communicates with the programmable display unit.

Figure 13:
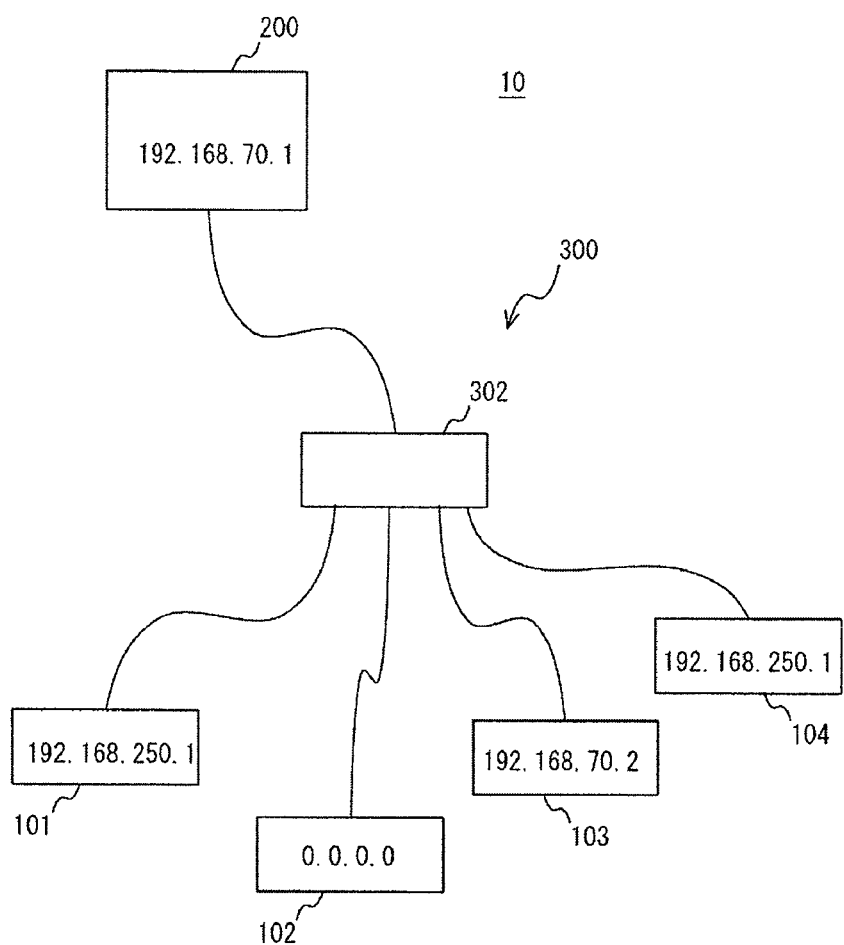
FIG. 13 is a diagram illustrating a state that one computer is connected to two or more programmable logic controllers.

On the other hand, in a case where the computer 200 is connected to the first controller 101, the second controller 102, the third controller 103 and the fourth controller 104 as illustrated in FIG. 13, the display unit 292 displays node list information generated by the computer 200 on the basis of the network configuration information 250, as illustrated in FIG. 14. Thus, the display unit 292 displays that the computer 200 is connected to two or more devices. In this case, the computer 200 may select one of the programmable logic controllers communicating therewith, from the node list information. The node list information illustrated in FIG. 14 is merely one example, and node list information generated herein is not limited thereto. The node list information may contain the information (e.g., the IP address, the MAC address) of the computer 200. The computer 200 may be connected to the programmable display unit rather than the programmable logic controller.

As described above, when the number of programmable logic controllers connected to the computer 200 is one, the computer 200 communicates with the programmable logic controller. Accordingly, no communication is established even when the user erroneously connects the computer 200 to the network where two or more programmable logic controllers are connected in actual fact while misunderstanding that the number of programmable logic controllers on the network is one. As the result, it is possible to prevent unusual communication due to the misunderstanding of the user.

It is to be understood that the disclosed embodiments are only illustrative and not restrictive in all respects. The scope of the present invention is interpreted by the appended claims rather than the foregoing description, and it is intended that all kinds of variations are contained in a meaning and a range equivalent to the claims.

DESCRIPTION OF SYMBOLS

10: Control system, 101: First controller, 102: Second controller, 103: Third controller, 104: Fourth controller, 105: Programmable logic controller, 111: Address setting function, 121: Connecting function, 131: Transmitting function, 151: Processing unit, 161: Nonvolatile memory unit, 171: Volatile memory unit, 181: Communication unit, 200: Computer, 210: Address setting function, 220: Connecting function, 230: Requesting function, 240: Receiving function, 260: Processing unit, 270: Nonvolatile memory unit, 280: Volatile memory unit, 290: Communication unit, 292: Display unit, 300: Network, 302: Hub

What is claimed is:

1. A control system, comprising:
an operation terminal; and
controllers configured to be connected to the operation terminal, wherein
the operation terminal comprises:
a processor; and
a memory including instructions that, when executed by the processor, cause the processor to perform operations including:
broadcasting, using link local addresses of the controllers, a request for identification information to the controllers;
receiving the identification information from the controllers and generating network configuration information on the basis of the identification information;
determining a number of controllers connected to the operation terminal based on the network configuration information; and
when the number of controllers connected to the operation terminal is one, establishing communication with the one controller connected to the operation terminal using a corresponding one of the link local addresses.

2. The control system according to claim 1, wherein the operation terminal further comprises a display for displaying that the two or more controllers are connected to the operation terminal when the number of controllers connected to the operation terminal is two or more.

3. The control system according to claim 1, wherein the processor determines that the number of controllers connected to the operation terminal is one when the operation terminal receives the identification information from one of the controllers.

4. The control system according to claim 1, wherein, when the number of controllers connected to the operation terminal is one, the operation terminal establishes the communication with the one controller using the corresponding one of the link local addresses.

5. The control system according to claim 1, wherein the operations further include:
when the number of controllers connected to the operation terminal is two or more, selecting one of the controllers connected to the operation terminal.

6. An operation terminal comprising:
a processor; and
a memory including instructions that, when executed by the processor, cause the processor to perform operations including:
broadcasting, using link local addresses of controllers, a request for identification information to the controllers, the controllers configured to be connected to the operation terminal;
receiving the identification information from the controllers and generating network configuration information on the basis of the identification information;
determining a number of controllers connected to the operation terminal based on the network configuration information; and
when the number of controllers connected to the operation terminal is one, establishing communication with the one controller connected to the operation controller using a corresponding one of the link local addresses.

7. The operation terminal according to claim 6, further comprising:
a display for displaying that the two or more controllers are connected to the operation terminal when the number of controllers connected to the operation terminal is two or more.

8. The operation terminal according to claim 6, wherein the processor determines that the number of controllers connected to the operation terminal is one when the operation terminal receives the identification information from one of the controllers.

9. The operation terminal according to claim 6, wherein, when the number of controllers connected to the operation terminal is one, the operation terminal establishes the communication with the one controller using the corresponding one of the link local addresses.

10. The operation terminal according to claim 6, wherein the operations further include:
when the number of controllers connected to the operation terminal is two or more, selecting one of the controllers connected to the operation terminal.

11. A non-transitory computer readable storage medium that stores a set of executable instructions, the executable instructions, when executed by a processor, cause the processor to perform operations comprising:
broadcasting, using link local addresses of controllers, a request for identification information to the controllers, the controllers configured to be connected to an operation terminal;
receiving the identification information from the controllers and generating network configuration information on the basis of the identification information;
determining a number of controllers connected to the operation terminal based on the network configuration information; and
when the number of controllers connected to the operation terminal is one, establishing communication with the one controller connected to the operation controller using a corresponding one of the link local addresses.

12. The non-transitory computer readable storage medium according to claim 11, the operations further comprising:
displaying that the number of controllers connected to the operation terminal is at least two when the number of controllers connected to the operation terminal is two or more.

13. The non-transitory computer readable storage medium according to claim 11, wherein
the processor determines the number of controllers connected to the operation terminal is one when the operation terminal receives the identification information from one of the controllers.

14. The non-transitory computer readable storage medium according to claim 11, wherein, when the number of controllers connected to the operation terminal is one, the communication is established with the one controller using the corresponding one of the link local addresses.

15. The non-transitory computer readable storage medium according to claim 11, wherein the operations further include:

when the number of controllers connected to the operation terminal is two or more, selecting one of the controllers connected to the operation terminal.

* * * * *